United States Patent
Kakiuchi et al.

(10) Patent No.: US 6,687,017 B1
(45) Date of Patent: Feb. 3, 2004

(54) PRINTER EQUIPPED WITH IMAGE RECOGNITION UNIT FOR COUNTERFEITING PREVENTION, COMPUTER PROVIDING PRINTER WITH PRINT SOURCE, AND PRINT SYSTEM INCLUDING PRINTER AND COMPUTER

(75) Inventors: Takashi Kakiuchi, Kyoto (JP); Junji Hiraishi, Kyoto (JP); Keitaro Taniguchi, Kyoto (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 09/402,065

(22) PCT Filed: Mar. 26, 1998

(86) PCT No.: PCT/JP98/01346

§ 371 (c)(1),
(2), (4) Date: Sep. 28, 1999

(87) PCT Pub. No.: WO98/44719

PCT Pub. Date: Oct. 8, 1998

(30) Foreign Application Priority Data

Apr. 1, 1997 (JP) .............................. 9-98388

(51) Int. Cl.⁷ .............................. G06F 15/00
(52) U.S. Cl. ............ 358/1.14; 358/1.15; 399/366
(58) Field of Search .................. 358/1.1, 1.5, 1.14, 358/1.15; 382/132, 133, 134, 135, 306; 399/366; 380/201, 203

(56) References Cited

U.S. PATENT DOCUMENTS 5,568,550 A * 10/1996 Ur .................. 380/3
5,982,956 A * 11/1999 Lahmi .................. 382/306

FOREIGN PATENT DOCUMENTS

| EP | 0 609 975 | 8/1994 |
|----|-----------|--------|
| EP | 0 675 631 | 10/1995 |
| EP | 0 751 663 | 1/1997 |
| GB | 2 275 387 | 8/1994 |
| JP | 4-207467 | 7/1992 |
| JP | 4-227372 | 8/1992 |
| JP | 5-183745 | 7/1993 |
| JP | 5-244414 | 9/1993 |
| JP | 5-284349 | 10/1993 |
| JP | 06-105140 | 4/1994 |
| JP | 06-348890 | 12/1994 |
| JP | 07-029021 | 1/1995 |
| JP | 7-143335 | 6/1995 |
| JP | 7-203193 | 8/1995 |
| JP | 07-212584 | 8/1995 |
| JP | 7-288681 | 10/1995 |
| JP | 08-006746 | 1/1996 |

OTHER PUBLICATIONS

Patent Abstracts of Japan, vol. 1995, No. 06, Jul. 31, 1995, Publication No. JP 07–072992, Publication Date: Mar. 17, 1995.
Patent Abstracts of Japan, vol. 1997, No. 05, May 30, 1997, Publication No. JP 09–16044, Publication Date: Jan. 17, 1997.

* cited by examiner

*Primary Examiner*—Mark Wallerson
(74) *Attorney, Agent, or Firm*—Dickstein Shapiro Morin & Oshinsky LLP

(57) ABSTRACT

A computer (901) has a function of controlling operation of an image recognition unit (201) for counterfeiting prevention in a printer (902). According to this function, a control signal (S1) for instructing operation of the image recognition unit is output to the printer when the type of a command (C1) received from an application (102) is a command type of an image as an object of counterfeiting prevention, while the control signal is not output when the type of the received command is not the command type of an image as an object of counterfeiting prevention. The printer has a function of operating the image recognition unit for image data (D1) applied from the computer only when the control signal is received from the computer. Therefore, in a print system using the computer and the printer equipped with the image recognition unit for counterfeiting prevention, the probability of falsely recognizing even an image irrelevant to counterfeiting to be an image as an object of counterfeiting prevention is lowered, and the printing-out speed is improved as a whole.

21 Claims, 8 Drawing Sheets

PRINTER EQUIPPED WITH IMAGE RECOGNITION UNIT FOR COUNTERFEITING PREVENTION, COMPUTER PROVIDING PRINTER WITH PRINT SOURCE, AND PRINT SYSTEM INCLUDING PRINTER AND COMPUTER

TECHNICAL FIELD

The present invention relates to printers equipped with an image recognition unit for preventing counterfeiting, for example, of bank notes and securities, computers providing the printer with print sources, and print systems including the printer and the computer. More specifically, the present invention relates to a printer, a computer, and a print system including the printer and the computer which are reliable in preventing false recognition by an image recognition unit for counterfeiting prevention from hindering printing out even of ordinary images.

BACKGROUND ART

Bank notes and securities have been counterfeited generally by using only color copy machines. Recently, similar counterfeiting has come to be possible even by using a combination of "color copy machine components" such as a color scanner, a personal computer, and a color printer.

The inventor previously proposed a novel color printer with a high possibility of preventing crimes, equipped with an image recognition unit for preventing counterfeiting, for example, of bank notes and securities. The basic operation of the image recognition unit provided in the color printer is to receive image data immediately before being printed out, extract a feature pattern of the received image data, collate it with the feature pattern of an image as an object of counterfeiting prevention, determine, based on the collation result, whether the received image data corresponds to the image data, for example, of bank notes or securities which are objects of counterfeiting prevention, and prohibit normal printing out of the received image data when it is determined that the received image data corresponds to the image data as an object of counterfeiting prevention.

Normal printing out is prohibited in various manners. There may be cases where printing out is not performed at all, where a color or a size is changed although printing out is performed, where a graphic pattern is covered with a certain color although printing out is performed, where a certain symbol or graphic pattern is overlapped although printing out is performed, and so on.

According to such a color printer, normal printing out is prohibited by operation of the equipped image recognition unit even if the printer is used to counterfeit bank notes and securities, for example, in combination with a color scanner and a personal computer. Thus, counterfeiting is prevented beforehand.

In the color printer equipped with such a conventional image recognition unit for counterfeiting prevention, however, all image data to be printed out have been determined as to whether they correspond to an image as an object of counterfeiting prevention by operating the image recognition unit regardless of how the image data to be printed out are formed. Therefore, even when an image produced by a personal computer using drawing software uncommonly includes a feature pattern to be recognized, it is falsely recognized as an image as an object of counterfeiting prevention, thus hindering normal printing out. Further, the image recognition unit is operated even for images, irrelevant to an image as an object of counterfeiting prevention when considering the image formation method, such as character fonts formed by word processing software and images formed only of geometric patterns made by CAD software. In those cases, the printing-out speed is unnecessarily lowered.

Here, the inventor obtained following information. That is, although the elements of images printed out by such type of color printers include character fonts, graphic elements such as straight lines and circles, and bit map images, only color bit map images among them are concerned with bank notes and securities. As long as bank notes and securities are regarded as images as an object of counterfeiting prevention, for example, operation of the image recognition unit for counterfeiting prevention is not necessary unless image data to be printed out is a color bit map image.

FIG. 9 is a block diagram illustrating how external image data is received and printed out in a conventional color printer.

The above described color printer is not provided with a specified scanner. As shown in FIG. 9, external image information ① is therefore read through a general purpose I/F (interface) as a unique language (printer language) ② and then expanded in an internal frame memory. Even for image formation, image data is formed to an image by subtractive color mixture of inks, for example, and therefore it is converted to CMYK type color information. Since image formation is generally carried out for each color, there is often image data of only one color at a time.

Thus, the color printer does not have an area to which full RGB color components of an image are collectively transferred as in a color copy machine. This is a serious problem with image recognition.

Solutions to this problem have been proposed such as the method 1 of recognition for each color using a laser drive signal ((①) in FIG. 9), the method 2 of recognition using data ((②) in FIG. 9) input to a color conversion portion and a gradation processing portion, for example, and the method 3 of recognition using data ((③) in FIG. 9) when external image information is expanded in a frame memory.

Recognizable color images can be obtained by these methods. However, the entire image to be formed is basically regarded as an object of recognition, which results not only in an increase in circuit size and cost and a reduction in the processing speed but in an increase in the possibility of false recognition due to recognition of an unnecessary region in the image. In the above described methods 1 and 2, there is not enough time from recognition to stopping output of a formed image. In the case of recognition for each color, it is difficult to define an image, which is prohibited from being output, in a necessary sufficient color range. In the above described method 3, a new problem emerges that the order of expansion is not uniform and collective recognition of the entire image is difficult.

Therefore, an object of the present invention is to provide a printer, a computer providing the printer with a print source, and a print system, which can reduce the probability of falsely recognizing an ordinary image irrelevant to counterfeiting to be an image as an object of counterfeiting prevention in an equipped image recognition unit for counterfeiting prevention and which can improve the printing-out speed as a whole.

Another object of the present invention is to provide a printer which can reduce the probability of false recognition of images by recognizing only image data in a necessary region so as to monitor data being processed in image formation and which can improve the processing speed.

DISCLOSURE OF THE INVENTION

The invention according claim 1 of the present specification is a method of processing input data in a printer, having a first examination step of examining whether received input data includes data which can correspond to data as an object of a prescribed examination, a second examination step of examining in detail data which can correspond to the data as an object of a prescribed examination to determine whether it is the object data when the first examination step detects that the data which can correspond to the data as an object of a prescribed examination is included, and a step of permitting data processing of the, input data when the first examination step detects that the data which can correspond to the data as an object of a prescribed examination is not included or the second examination step detects that the data which can correspond to the data as an object of a prescribed examination is not the object data.

Since the input data is examined at two stages in the above described input data processing method, it is possible to quickly detect whether data in the input data is the object data.

A controller of the printer according to claim 2 of the present specification is formed of first examination means for examining whether received input data includes data which can correspond to data as an object of a prescribed examination, second examination means for examining in detail data which can correspond to the data as an object of examination to determine whether it is the object data when the first examination means detects that the input data includes the data which can correspond to the data as an object of a prescribed examination, and data processing means for permitting printing of the input data when the first examination means detects that the input data does not include the data which can correspond to the data as an object of a prescribed examination or the second examination means detects that the data which can correspond to the data as an object of examination is not the object data.

Since the controller may be separately provided from the printer or contained in the printer, whether or not the input data includes data which corresponds to data as an object of a prescribed examination can be effectively detected by the two-stage examination, and the examination operation can be carried out outside or inside the printer.

A printer according to claim 3 of the present specification is formed of first examination means for examining whether received input data includes data which can correspond to data as an object of a prescribed examination, second examination means for examining in detail data which can correspond to the data as an object of a prescribed examination to determine whether it is the object data when the first examination means detects that the input data includes the data which can correspond to the data as an object of a prescribed examination, data processing means for permitting printing of the input data when the first examination means detects that the input data does not include the data which can correspond to the data as an object of a prescribed examination or the second examination means detects that the data which can correspond to the data as an object of a prescribed examination is not the object data, and a print output portion for printing and outputting the input data in response to a printing permission by the data processing means.

Since the input data which is permitted for printing in the printer is specified after the two-stage examination, it is possible to efficiently specify data which can be permitted for printing.

A printer according to claim 4 of the present specification includes first examination means for examining whether received input data includes bit map data, second examination means for examining in detail bit map data to determine whether it includes specific graphic data when the first examination means detects that the input data includes the bit map data, data processing means for permitting printing of the input data when the first examination means detects that the input data does not include the bit map data or the second examination means detects that the bit map data does not include the specific graphic data, and a print output portion for printing and outputting the input data in response to a printing permission by the data processing means.

Since the input data which is permitted for printing and outputting by the print output portion is specified after the two-stage examination concerning the bit map data by the first and second examination means, the input data which should be permitted for printing can be detected efficiently.

The invention according to claim 5 of the present specification is a print system which includes a computer with an installed printer driver, and a printer containing an image recognition unit for counterfeiting prevention and a printing out device controlled according to a recognition result of the input recognition processor. Specifically, in the print system, the printer driver of the computer has a function of expanding a command received from an application to image data and then sending it to the printer, and the printer controller has a function of operating the image recognition unit for counterfeiting prevention for image data which arrives from the computer.

The computer has a function of sending to the printer a control signal for instructing operation of the image recognition unit for counterfeiting prevention when the type of a command received from an application is a command type to which an image as an object of counterfeiting prevention belongs, and not sending the above described control signal to the printer when the type of a command received from an application is not the command type to which an image as an object of counterfeiting prevention belongs. Further, the printer has a function of operating the image recognition unit only when the control signal for instructing operation is received from the computer.

The above described image recognition unit for counterfeiting prevention determines correspondence of image data to be printed out with an image as an object of counterfeiting prevention by using a technique such as pattern recognition, when the image data is determined to be an image as an object for counterfeiting prevention, generates an output informing that, and prohibits a normal print out result from being obtained from the printing out device. As described above, the normal print out result is prohibited in various manners. There may be cases where printing out is not performed at all, where a color or a size is changed although printing out is performed, where a graphic pattern is covered by a certain color although printing out is performed, where a certain symbol or graphic pattern is overlapped although printing out is performed. It is noted that the significance of the image recognition unit for counterfeiting prevention is to be similarly interpreted in the following claims as well.

Further, the "function of expanding a command received from an application to image data and then sending it to the printer" means a function of, when commands received from application software, for example, for drawing, word processing and scanning correspond to character fonts, graphic elements such as straight lines and circles, and bit map images, expanding these commands to image data and then sending them to the printer. Representative printer drivers having such a function are printer drivers for ink jet printers and dot impact printers, for example. Besides, this method can be adopted in various types of printers. It is noted that the meaning of the "function of expanding a command received from an application to image data and then sending it to the printer" is to be similarly interpreted in the following claims as well.

Further, the "command type to which an image as an object of counterfeiting prevention belongs" is variously determined according to what image is assumed as the image as an object of counterfeiting prevention. When bank notes and securities, for example, are assumed to be images as an object of counterfeiting prevention, the command type would correspond to a color gray bit map image which is read by a color scanner, for example.

Further, "sending a control signal for instructing operation" includes a case where the control signal is sent to a printer as addition information on image data, in addition to a case where the control signal is sent to a printer through a signal line for control signals between a personal computer and the printer. Although the formation of the control signal is basically sufficient as a 1-bit logic signal which represents whether or not operation is possible, it may also be a signal to control a multiple bit code representing one of a character font, drawing data such as straight lines and circles, or a bit map images as its command type. In this case, whether or no the image recognition unit can operate is determined by decoding the code on the printer side.

According to the invention of claim 5, an illicit act of counterfeiting bank notes and securities, for example, by a combination of a color scanner, a personal computer and a color printer, for example, can be effectively prevented by normal operation of the in-printer image recognition unit in response to an operation instruction control signal issued by the personal computer. When an image produced by a personal computer using word processing and drawing software is printed out by a printer, and the same or similar feature pattern compared with the feature pattern of an image as an object of counterfeiting prevention happens to exist in the image data to be printed out, the operation instruction control signal is not issued from the personal computer to the printer, and thus the in-printer image recognition unit is substantially invalidated. Thus, abnormal printing operation caused by false recognition of the image recognition unit is prevented.

In addition, unless the type of a command received from an application is the command type to which an image as an object of counterfeiting prevention belongs, the operation instruction control signal for the image recognition unit is not issued from the computer. Thus, the in-printer image recognition unit does not operate except for an image corresponding to a command to which an image as an object for counterfeiting prevention belongs. It eliminates useless image recognition processing time. Therefore, compared with a conventional system in which the in-printer image recognition unit is operated for images of all command types regardless of how the images are derived, the printing-out speed can be improved as a whole.

The invention according to claim 6 of the present specification is a computer which includes an installed printer driver having a function of expanding a command received from an application to image data and then sending it to a printer. The computer has a function of sending to the printer a control signal for instructing operation of the image recognition unit for counterfeiting prevention when the type of a command received from an application is the command type to which an image as an object of counterfeiting prevention belongs, and not sending the control signal to the printer when it is not the command type to which an image as an object of counterfeiting prevention belongs.

According to the computer of the invention in claim 6, when a certain command for printing is received from an application, not only is it expanded to image data and sent to the printer but the printer is informed whether the in-printer image recognition unit is to be operated for the image data. It is therefore possible to independently making a decision on the printer side as to whether the image recognition unit for counterfeiting prevention is to be operated. It prevents a reduction in the printing-out speed caused when printing out is hindered by false recognition of image data, apparently irrelevant to an object of counterfeiting prevention, to be an image as an object of counterfeiting prevention and when useless image recognition processing is carried out for such image. Thus, the printer performance can be improved.

The invention according to claim 7 is a printer which contains an image recognition unit for counterfeiting prevention and a printing out device controlled according to a recognition result of the image recognition unit. Specifically, the printer controller has a function of operating the contained image recognition unit for image data to be printed out only when a control signal for instructing operation of the image recognition unit for counterfeiting prevention is externally sent.

According to the printer of claim 7, whether or not the contained image recognition unit for counterfeiting prevention can operate can be controlled by the externally applied operation instruction control signal. By applying the operation instruction control signal for each image data to be printed, therefore, image recognition processing operation can be appropriately controlled according to image data.

A print system according to claim 8 of the present specification includes a computer with an installed printer driver, and a printer which contains an image recognition unit for counterfeiting prevention and a printing out device controlled according to a recognition result of the image recognition unit.

In this system, the printer driver of the computer has a function of sending a command received from an application as it is to a printer without expanding it to image data. Further, the print controller has a function of operating the image recognition unit for counterfeiting prevention for image data which is obtained by expanding a command arriving from the computer to image data. Further, the printer controller has a function of not operating the image recognition unit for counterfeiting prevention when the type of a command arriving from the computer is not the command type to which an image as an object of counterfeiting prevention belongs.

Here, the "function of sending a command received from an application as it is to a printer without expanding it to image data" means a function of, when commands received from application software, for example, for drawing, word processing and scanning correspond to character fonts, graphic elements such as straight lines and circles, and bit map images, sending these commands as they are to a printer without expanding them to image data. A representative printer driver having such a function is a printer driver for laser printers, for example.

According to the invention of claim 8, an illicit act of counterfeiting bank notes and securities by a combination of a color scanner, a personal computer and a color printer, for example, can be effectively prevented by normal operation of the in-printer image recognition unit according to a result of command type determination on the printer side. When an image produced by a personal computer using word processing and drawing software is to be printed out by a printer, existence of the same or similar feature pattern compared with the feature pattern of an image as an object of counterfeiting prevention in the image data to be printed out substantially invalidates the in-printer image recognition unit as a result of command type determination on the printer side. Thus, abnormal printing caused by false recognition of the image recognition unit is prevented.

According to the invention of claim 8, the image recognition unit does not operate unless the type of a command received from a computer is the one to which an image as an object of counterfeiting prevention belongs. Since the in-printer image recognition unit does not operate except for an image corresponding to a command to which an image as an object of counterfeiting prevention belongs, useless image recognition time is eliminated, and the printing-out time can be improved as a whole compared with a conventional system in which the image recognition unit is operated for images of all command types regardless of how the images are derived.

The invention according to claim 9 of the present specification is a printer which has an image recognition unit for counterfeiting prevention, a printing out device controlled according to a recognition result of the image recognition unit, and a controller, and includes a function of operating the image recognition unit for counterfeiting prevention for image data obtained by expanding a command arriving from a computer to the image data. Specifically, the printer controller has a function of not operating the image recognition unit for counterfeiting prevention when the type of a command arriving from the computer is not the one to which an image as an object of counterfeiting prevention belongs.

According to the printer of claim 9, whether or not the contained image recognition unit for counterfeiting prevention can operate is automatically determined according to the type of a command prior to expansion to the image data. Even when a special control signal is not externally applied, whether or not the image recognition unit can operate is appropriately controlled according to the image data.

The invention according to claim 10 of the present specification is a recording medium on which a program for operating a computer is recorded. The problem causes the computer to function as means for expanding a command received from an application to image data and then sending it to a printer, and means for sending to the printer an instruction to operate the image recognition unit for counterfeiting prevention when the type of a command received from an application is the command type to which an image as an object of counterfeiting prevention belongs, and not sending to the printer an instruction to operate the image recognition unit for counterfeiting prevention when the type of a command received from an application is not the command type to which an image as an object of counterfeiting prevention belongs.

The above described "program" would generally correspond to printer driver software which is installed in a hard disk.

The invention according to claim 11 of the present specification is a recording medium on which a program is recorded. The program causes a computer to function as a printer which includes means for operating a printing out device according to externally applied image data, means for operating the image recognition unit for counterfeiting prevention for the image data, and means for controlling operation of the image recognition unit according to an externally applied operation instruction.

The above described "program" would generally correspond to a system program which is stored in a semiconductor ROM of the printer.

The invention according to claim 12 of the present specification is a recording medium on which a program is recorded. The program causes a computer to function as a printer which includes means for operating a printing out device according to image data obtained by expanding an externally applied command to an image, means for operating the image recognition unit for counterfeiting prevention for the image data obtained by expanding the externally applied command to the image, and means for not operating the image recognition unit when the type of the externally applied command does not correspond to the command type to which an image as an object of counterfeiting prevention belongs.

The above described "program" would generally correspond to a system program which is stored in a semiconductor ROM of the printer.

In the print system according to each of claims 5 and 8, the command type to which an image as an object of counterfeiting prevention belongs may be a color image command.

The invention according to claim 13 of the present specification is characterized in that the command type to which an image as an object of counterfeiting prevention belongs is a color image command in the computer according to claim 6.

In the printer according to claim 9, the command type to which an image as an object of counterfeiting prevention belongs may be a color image command.

In the recording medium according to each of claims 10 and 12, the command type to which an image as an object of counterfeiting prevention belongs may be a color image command.

In the above described invention, if the command type to which an image as an object of counterfeiting prevention belongs is a color image command, further effects are attained that operating reliability is high in preventing counterfeiting of bank notes and securities and the printing-out speed is not lowered.

A printer according to claim 14 of the present specification has instruction examination means for examining whether received input data includes an exchange instruction to exchange bit map data to print data, and recognition means for recognizing whether the bit map data includes a specific graphic pattern when the instruction examination means detects the exchange instruction, the recognition means not operated when the instruction examination means detects the exchange instruction.

According to the printer of claim 14, only when the instruction to exchange bit map data to print data is detected in input data, whether or not the bit map data includes a specific graphic pattern is recognized. Thus, useless recognition processing is avoided, which enables efficient recognition.

BEST MODES FOR CARRYING OUT THE INVENTION

In the following, the present invention will be described in detail with reference to the drawings.

First Embodiment

Figure 1:
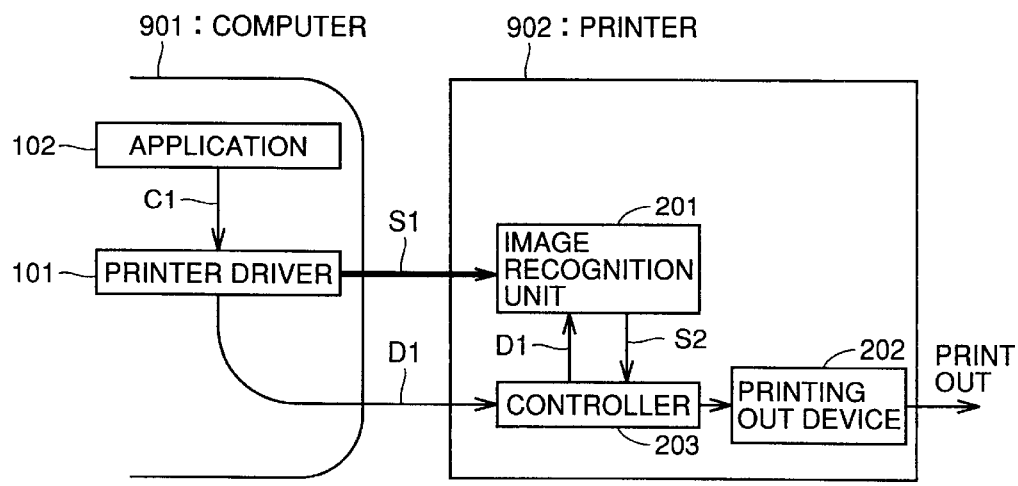
FIG. 1 is a block diagram showing a construction of a print system according to a first embodiment of the present invention.

A construction of a print system according to a first embodiment of the present invention is shown in FIG. 1. The print system in FIG. 1 includes a computer 901 such as a personal computer with an installed printer driver 101 and application 102, and a printer 902 which contains an image recognition unit 201 recognizing whether input image data is image data as an object of counterfeiting prevention, a printing out device 202 printing out image data, and a controller 203 controlling printing out device 202 according to a recognition result of image recognition unit 201. Printer 902 prints out color images for each page. Printing out device 202 prints electrical image data on a print paper as a "hard copy."

Printer driver 101 of computer 901 includes in advance a function of expanding image data corresponding to a command C1 received from application 102 to image data D1, which can be printed out, according to command C1 concerning image data to be printed out, and then sending command C1 to printer 902. Printer driver 101 is a printer driver for dot impact printers or ink jet printers, for example. Application 102 is application software for producing various image sources such as word processing software, graphic pattern formation software and scanner software.

Controller 203 of printer 902 has a function of operating image recognition unit 201 for counterfeiting prevention for image data D1 applied from computer 901 for printing out. Image recognition unit 201 determines whether image data D1 which is applied from controller 203 and is to be printed out corresponds to an image as an object of counterfeiting prevention such as by a pattern recognition method, when image data D1 is determined to be an image as an object of counterfeiting prevention, generates an output for informing that, and prohibits a normal print out result concerning image data D1 from being obtained from printing out device 202.

For image data D1, the normal print out result is prevented from being obtained in various manners. There may be cases where printing out is not performed at all, where a color or a size is changed although printing out is performed, where a graphic pattern is covered by a certain color although printing out is performed, where a certain symbol or graphic pattern is overlapped although printing out is performed, and so on.

Figure 2:
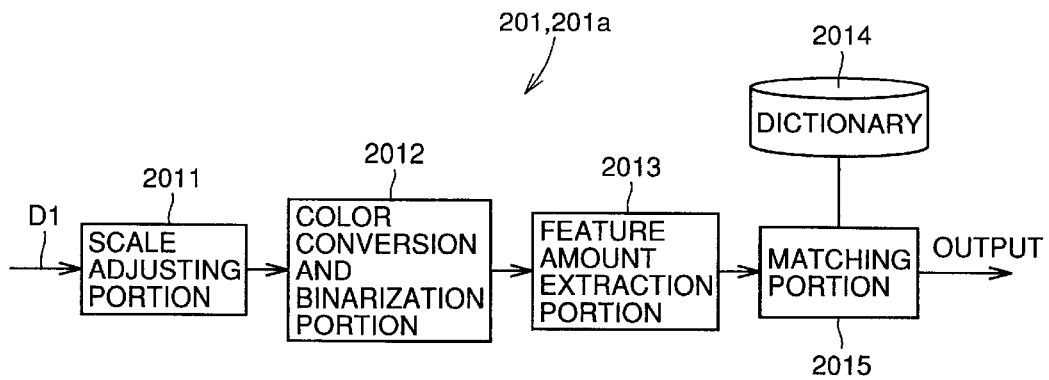
FIG. 2 is a block diagram showing a construction of the image recognition unit in FIG. 1.

FIG. 2 is a block diagram showing a construction of image recognition unit 201 in FIG. 1. Image recognition unit 201 in FIG. 2 is formed of a scale adjusting portion 2011 performing scale adjustment of input image data D1 for normalization, a color conversion and binarization portion 2012 performing color conversion and binarization of the scale-adjusted image data to emphasize a feature amount, a feature amount extraction portion 2013 extracting the feature amount from the color converted and binarized image data, a dictionary 2014 storing in advance various feature amounts unique to images as an object of counterfeiting prevention (images such as bank notes and securities, for example), and a matching portion 2015 collating the feature amount extracted by feature amount extracting portion 2013 with various feature amounts stored in dictionary 2014 to recognize whether the input image data corresponds to an image as an object of counterfeiting prevention and outputting the recognition result.

In this embodiment, an output informing that the input image data corresponds to an image as an object of counterfeiting prevention, as the recognition result by matching portion 2015, is output as it is to controller 203 as an output stop signal S2 for printing out device 202. In response to reception of output stop signal S2, controller 203 forces to stop operation of printing out device 202, thereby completely preventing printing out.

A main part of the print system in FIG. 1 will be described in the following. Printer driver 101 of computer 901 has in advance a function of outputting a control signal S1 according to input command C1. According to this function, control signal S1 for instructing operation of image recognition unit 201 for counterfeiting prevention is output to printer 902 when the type of input image data indicated by command C1 input from application 102 is the one to which an image as an object of counterfeiting prevention belongs, and control signal S1 is not output to printer 902 when the command type is not the one to which an image as an object of counterfeiting prevention belongs.

The types of image data indicated by command C1 are for example in the following (1) to (3).

(1) texts of characters formed of fonts
(2) drawing commands for straight lines, rectangles, curves, circles, and so on
(3) bit map images
   ① binary bit map images
   ② multi-value (gray) bit map images
      (a) monochrome gray bit map images
      (b) color gray bit map images Among the various image data above, image data formed of command C1 other than command C1 corresponding to a color gray bit map image could not substantially be used to counterfeit bank notes and securities. Therefore, printer driver 101 of computer 901 monitors whether a page when image data D1 is produced includes command C1 indicating a color gray bit map image, when it includes the image, determines that image data D1 can correspond to an image as an object of counterfeiting prevention, and outputs control signal S1 to printer 902 so as to operate image recognition unit 201. When command C1 indicating a color gray bit map image is not included, however, printer driver 101 determines that image data D1 does not correspond to an image as an object of counterfeiting prevention, and does not output control signal S1 to printer 902 so as not to operate image recognition unit 201.

Printer 902 has a function of operating image recognition unit 201 only when control signal S1 is received from computer 901. As described above, when it is recognized that image data D1 corresponds to an image as an object of counterfeiting prevention as a result of operation of image recognition unit 201, image recognition unit 201 outputs output stop signal S2 to controller 203. Thus, controller 203 forces to stop operation of printing out device 202 in response to reception of output stop signal S2, thereby prohibiting printing out of the image as an object of counterfeiting prevention.

Figure 3:
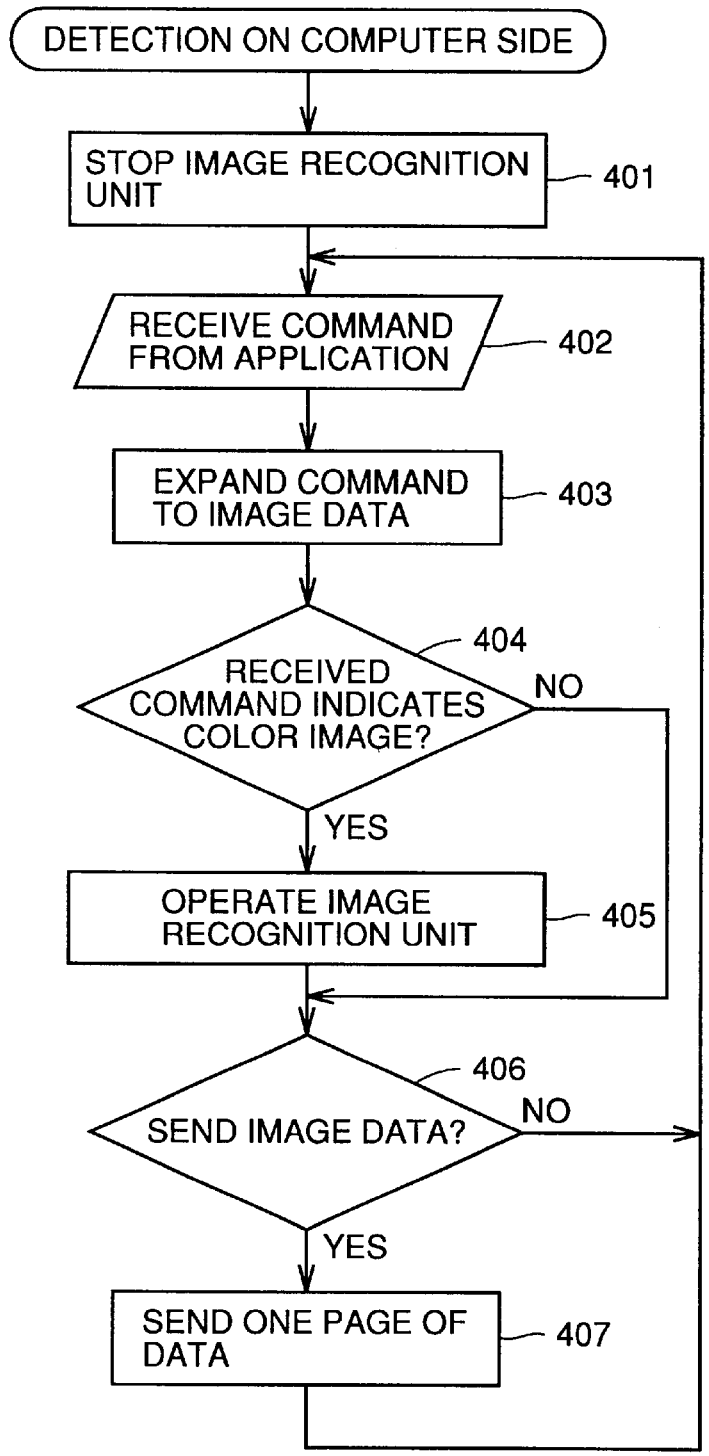
FIG. 3 is a flow chart showing a process of the computer in FIG. 1.

FIG. 3 is a flow chart showing a process of computer 901 in FIG. 1. An operation of the print system in FIG. 1 will be described in order of time with reference to the flow chart in FIG. 3.

When the process starts in computer 901, printer driver 101 initializes control signal S1 at an appropriate value, outputs the signal to printer 902, and stops operation of image recognition unit 201 for initialization (step 401).

Thereafter, printer driver 101 receives command C1 corresponding to a print source from application 102 (step 402), and expands received command C1 to image data D1 (step 403).

Thereafter, printer driver 101 determines whether the type of the image data indicated by command C1 received from application 102 is the type of image data as an object of counterfeiting prevention (a color gray bit map image in this embodiment) (step 404). When the type of the image data indicated by command C1 received from application 102 is determined to be a color gray bit map image (YES in step 404), control signal S1 is set at an appropriate value and thus image recognition unit 201 of printer 902 attains an operative state. When the type of the image data indicated by command C1 received from application 102 is not determined to be a color gray bit map image (NO in step 404), the process of step 405 is skipped and control signal S1 is not changed. Thus, image recognition unit 201 of printer 902 remains to be stopped.

When one page of image data D1 is stored in a memory, not shown, while the above described steps 402 to 405 are repeated (YES in step 406), the stored one page of image data D1 is output to printer 902 (step 407). This operation is repeated on the side of computer 901.

On the side of printer 902, only when image data D1 including a color gray bit map image is input from computer 901, image recognition unit 201 operates. It is therefore possible to effectively prevent counterfeiting of bank notes and securities using a combination of a color scanner, a computer and a printer, for example. When image data D1 formed by a computer using word processing and drawing software, for example, is to be printed out by a printer, and image data D1 includes by chance the same or similar feature amount compared with various feature amounts of images as an object of counterfeiting prevention, control signal S1 is not output from computer 901 to printer 902. Thus, image recognition unit 201 in printer 902 is substantially invalidated, thereby preventing abnormal printing operation due to false recognition by image recognition unit 201.

According to this embodiment, as long as the type of image data indicated by command C1 output from application 102 does not correspond to the type to which image data as an object of counterfeiting prevention belongs, computer 901 does not output control signal S1. Thus, image recognition unit 201 does not operate for data other than image data D1 which corresponds to command C1 indicating the image data type to which image data as an object of counterfeiting prevention belongs. As a result, useless image recognition time is eliminated, and the processing speed of the entire system including the printing-out speed can be improved compared with a conventional system in which image recognition is carried out on all image data D1 regardless of how the image is derived.

Second Embodiment

Figure 4:
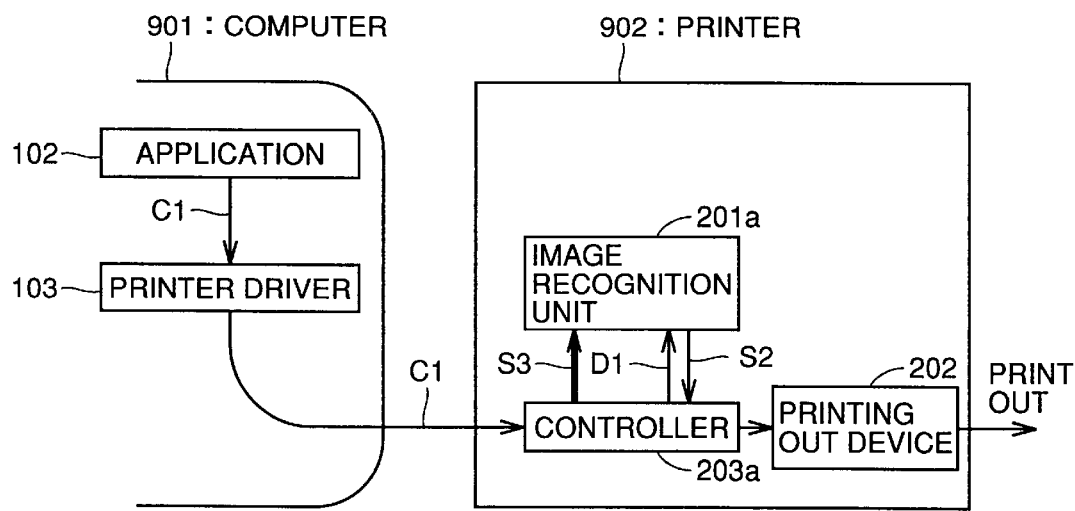
FIG. 4 is a block diagram showing a construction of a print system according to a second embodiment of the present invention.

FIG. 4 is a block diagram showing a construction of a print system according to a second embodiment of the present invention.

In FIG. 4, the same reference characters denote the same parts as FIG. 1 and detailed description thereof will not be repeated.

The print system in FIG. 4 includes a computer 901 such as a personal computer which has an application 102 and a printer driver 103, a printer 902 which has an image recognition unit 201 for counterfeiting prevention, a printing out device 202, and a controller 203a controlling printing out device 202 according to a recognition result of image recognition unit 201. The constructions of FIG. 1 and FIG. 4 are different in that printer driver 101 of FIG. 1 is changed to printer driver 103, image recognition unit 201 to image recognition unit 201a, and controller 203 to controller 203a. Other parts of FIG. 4 are the same as FIG. 1.

Printer driver 103 of computer 901 has a function of outputting command C1 received from application 102 as it is to printer 902 without expanding image data according to command C1. Printer driver 103 is a printer driver for laser printers, for example.

Controller 203a of printer 902 has a function of operating image recognition unit 201a for counterfeiting prevention for image data D1 obtained by expanding an image according to command C1 input from computer 901. As described with reference to FIG. 1, image recognition unit 201a for counterfeiting prevention determines whether image data D1 to be printed out corresponds to an image as an object of counterfeiting prevention such as by a pattern recognition method, when image data D1 is determined to be an image as an object of counterfeiting prevention, generates an output informing that, and prohibits a normal print out result from being obtained from printing out device 202. An construction of image recognition unit 201a is as shown in FIG. 2 above.

A main part of the print system in FIG. 4 will be described in the following. Controller 203a of printer 902 has a function of operating image recognition unit 201a for counterfeiting prevention when the type of image data indicated by command C1 received from computer 901 corresponds to the one to which image data as an object of counterfeiting prevention belongs, and not operating image recognition unit 201a for counterfeiting prevention when the type of image data indicated by received command C1 does not correspond to the one to which the image data as an object of counterfeiting prevention belongs.

The types of image data indicated by command C1 include the above described three types (1) to (3). Of the various image data described above, image data other than color gray bit map images cannot virtually be used to counterfeit bank notes and securities.

For each page where image data D1 is being formed, controller 203a monitors whether it includes command C1 indicating a color gray bit map image. When it includes command C1 indicating the image, it is determined that image data D1 may correspond to an image as an object of counterfeiting prevention, and image recognition unit 201a is controlled to operate by using control signal S1. When the page does not include command C1 indicating a color gray bit map image, it is determined that image data D1 does not correspond to an image as an object of counterfeiting prevention, and image recognition unit 201a is controlled not to operate by using control signal S1.

When it is recognized that received image data D1 corresponds to an image as an object of counterfeiting prevention as a result of operation of image recognition unit 201a, image recognition unit 201a outputs an output stop signal S2 to controller 203a. Controller 203a stops operation of printing out device 202 in response to reception of output stop signal S2, thereby prohibiting printing out of the image as an object of counterfeiting prevention.

Figure 5:
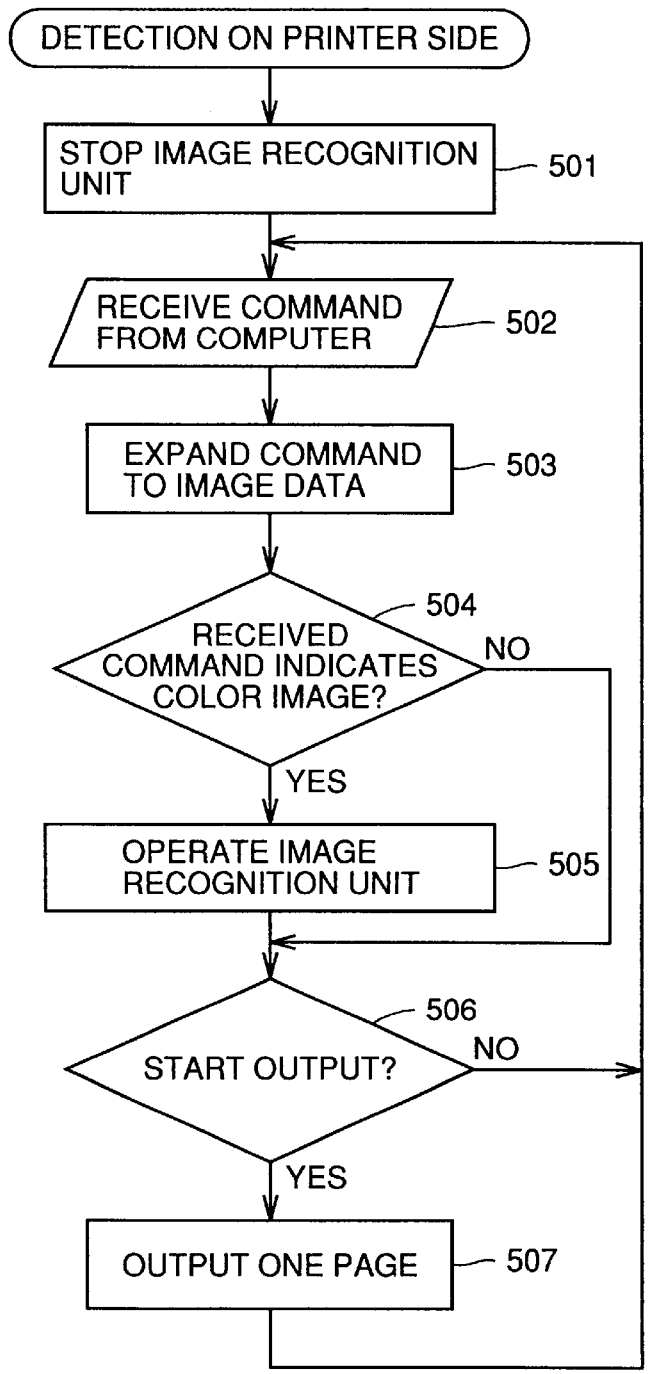
FIG. 5 is a flow chart showing a process of the printer in FIG. 4.

FIG. 5 is a flow chart showing a process of printer 902 in FIG. 4. An operation of the print system in FIG. 4 will be described in order of time with reference to the flow chart in FIG. 5.

When the process starts in printer 902, controller 203a initializes control signal S1 at an appropriate value and outputs the signal to image recognition unit 201a to initialize operation of image recognition unit 201a to a stopped (non-operative) state (step 501).

Thereafter, controller 203a receives command C1 corresponding to a print source from computer 901 and carries out expansion to image data D1 according to received command C1 (steps 502 and 503).

Thereafter, controller 203a determines whether the type of image data D1 indicated by command C1 received from computer 901 is the one to which image data as an object of counterfeiting prevention belongs (here, a color gray bit map image). When it is determined that the type of image data D1 indicated by command C1 is a color gray bit map image (YES in step 504), control signal S3 is output to render image recognition unit 201a operative. When it is determined that the type of image data D1 indicated by command C1 is not a color gray bit map image (NO in step 504), the process of step 505 is skipped and image recognition unit 201a remains to be stopped.

When one page of image data D1 is stored in a memory, not shown, in printer 902 by repetition of the process in steps 502 to 505, it is determined that printing out should be started (YES in step 506), and stored image data D1 is output to printing out device 202 and printed out (step 507). Thereafter, the above described operation is repeated.

As described above, on the side of printer 902, image recognition unit 201a is operated by control signal S3 only when command C1 corresponding to image data including a color gray bit map image is received from computer 901. Thus, counterfeiting of bank notes and securities using a combination of a color scanner, a personal computer and a color printer can be effectively prevented because image recognition unit 201a normally operates according to a determination result of the type of image data D1 indicated by command C1 on the side of printer 902 with application of the system in FIG. 4. When image data formed by a personal computer with word processing and drawing software, for example, is printed out by using printer 902, existence of the same or similar feature amount with respect to the feature amount of an image as an object of counterfeiting prevention in image data D1 to be printed out substantially invalidates image recognition unit 201a according to a determination result of the type of image data D1 indicated by command C1 on the side of printer 902. Thus, abnormal printing due to false recognition by image recognition unit 201a is avoided.

According to the system in FIG. 4, image recognition unit 201a does not operate as long as the type of image data D1 indicated by command C1 received from computer 901 in printer 902 is not the one to which image data as an object of counterfeiting prevention belongs. As a result, image recognition unit 201a of printer 902 does not operate except for image data D1 corresponding to command C1 indicating the type to which image data as an object of counterfeiting prevention belongs. Thus, useless image recognition time is eliminated during printing out in the system. Therefore, the overall processing speed including the printing-out speed can be improved compared with a conventional system in which an image recognition unit operates for image data D1 corresponding to all types indicated by command C1 regardless of how they are derived.

According to the systems in FIGS. 1 and 4 above, the probability of falsely recognizing ordinary images irrelevant to counterfeiting to be images as an object of counterfeiting prevention can be lowered, and the printing-out speed can be improved for the entire system.

Third Embodiment

Recognition of images for counterfeiting prevention according to a third embodiment of the present invention will be described in the following. The image recognition is applied to an image formation apparatus or image processing apparatus provided in a general printer, thereby carrying out image recognition for counterfeiting prevention when data of a color bit map image which may include a counterfeited image is transferred through an internal bus of the image formation apparatus or image processing apparatus or it is expanded in a frame memory.

Figure 6:
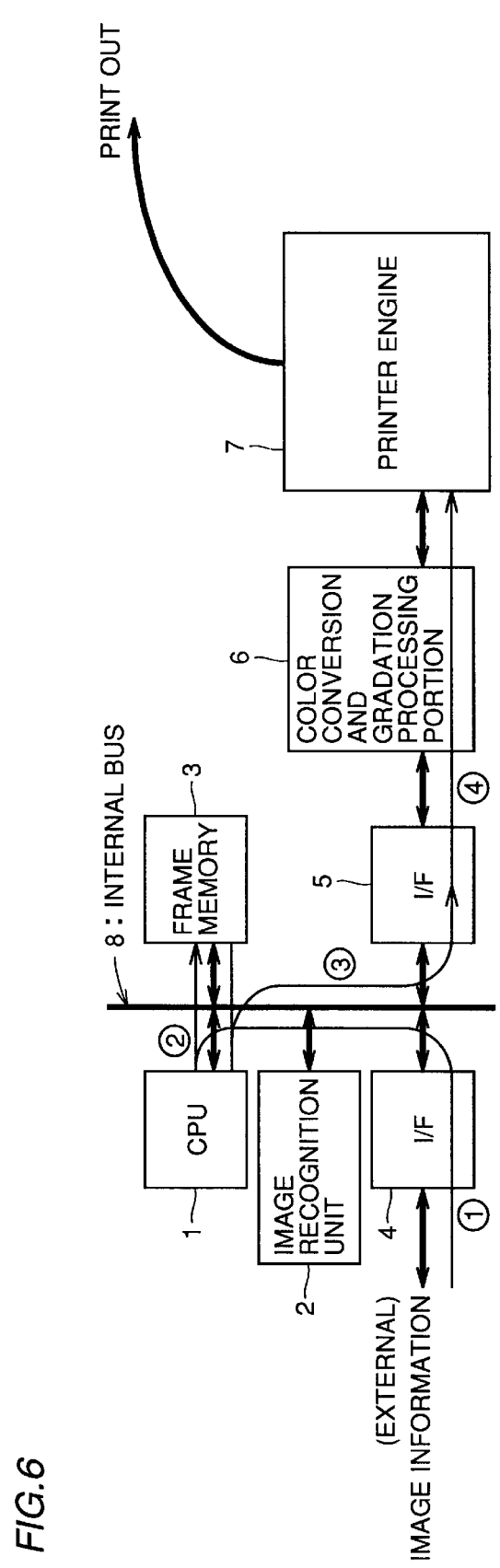
FIG. 6 shows a schematic construction of a printer (image formation apparatus) according to a third embodiment of the present invention.

FIG. 6 shows a schematic construction of a printer (image formation apparatus) according to the third embodiment of the present invention.

Figure 7:
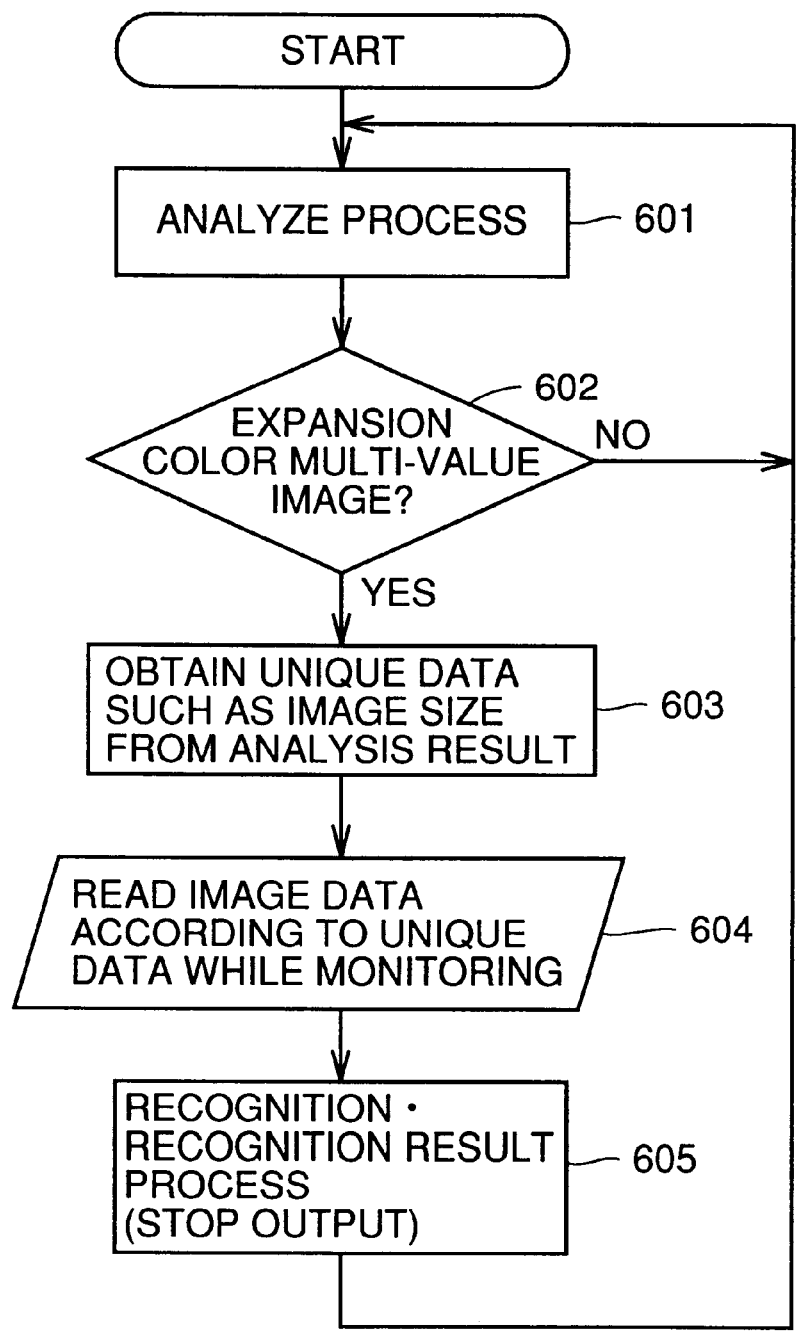
FIG. 7 is a schematic flow chart showing a process of specifying and recognizing image data which can be a counterfeited image in the apparatus in FIG. 6.

FIG. 7 is a schematic flow chart of a process of specifying and recognizing image data which can be a counterfeited image in the apparatus of FIG. 6.

Figure 8:
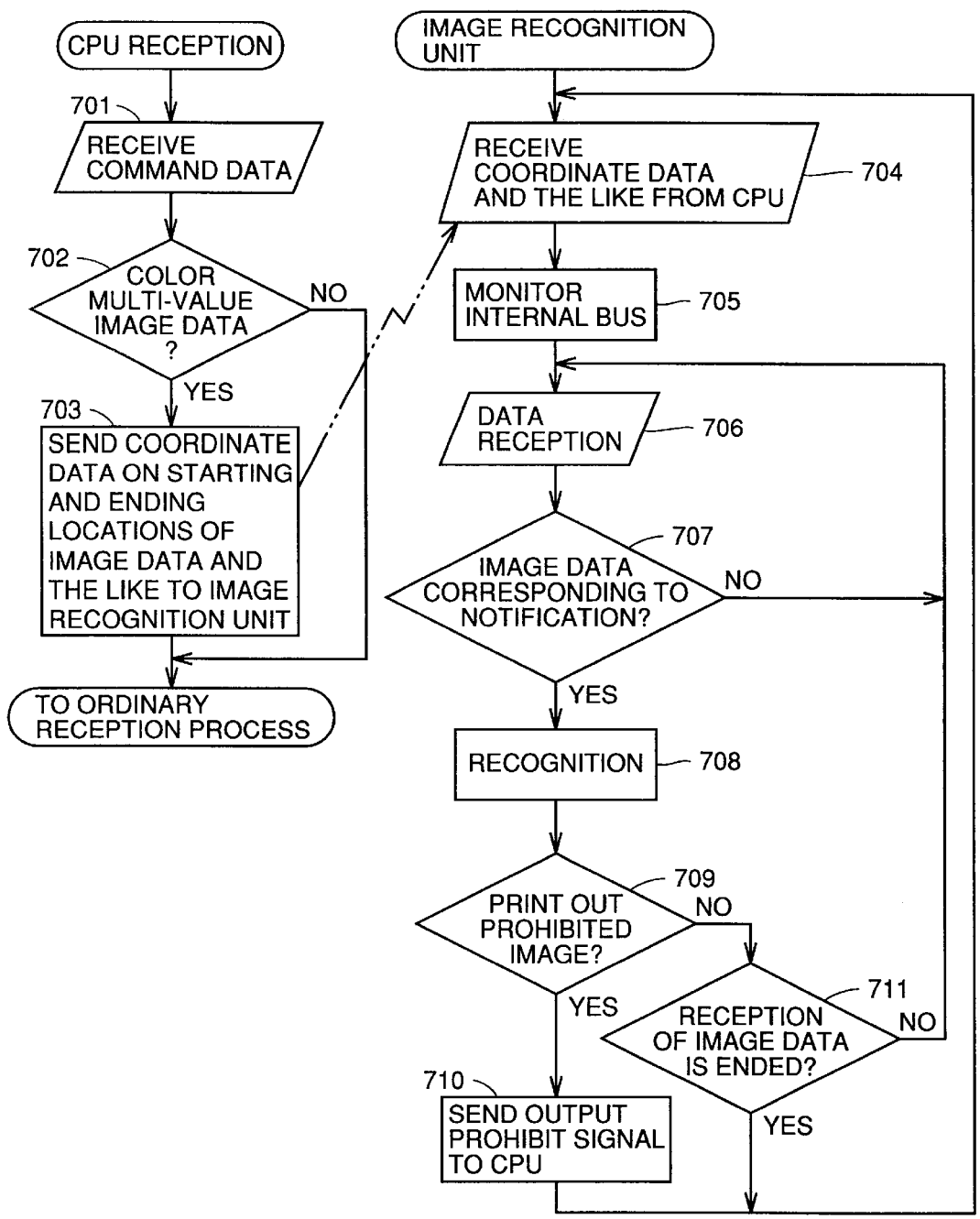
FIG. 8 is a detailed flow chart showing the process of specifying and recognizing image data which can be a counterfeited image in the apparatus in FIG. 6.

FIG. 8 is a detailed flow chart of the process of specifying and recognizing image data which can be a counterfeited image in the apparatus of FIG. 6.

FIG. 6 schematically shows parts associated mainly with image data processing. The printer in FIG. 6 includes a CPU 1, an image recognition unit 2 recognizing an image for preventing image counterfeiting, a frame memory 3, I/Fs (interfaces) 4, 5, a color conversion and gradation processing portion 6 carrying out color conversion and gradation processing on image data for printing out, a printer engine 7 printing out image data processed in processing portion 6, and an internal bus 8 connecting these portions.

In FIG. 6, the following processes ① to ④ are generally carried out as an image formation procedure. It is noted that the processes ① to ④ are carried out during data transfer ① to ④ in FIG. 6. When image data in the form of a printer language (or a protocol) is received through I/F 4 from an external computer, for example, CPU 1 receives the image data through internal bus 8 (process ①) and expands it in frame memory 3 (process ②). When one page (or a prescribed printing unit) of data expansion ends at this time, CPU 1 reads out one page of data from frame memory 3 in an output order (process ③). The read data is processed in color conversion and gradation processing portion 6 through I/F 5 and then formed to an image which can be printed out by printer engine 7 (process ④).

It is noted that some printers repeat the processes ③ and ④ for each printing to print out one page (or a prescribed printing unit) of images.

The process procedure varies according to the type of a printer. There may be cases where data in frame memory 3 is compressed which requires data transfer for compression and uncompression, and where data is directly transferred to frame memory 3 without passing through CPU 1. However, data is basically processed in the above described procedure.

Figure 9:
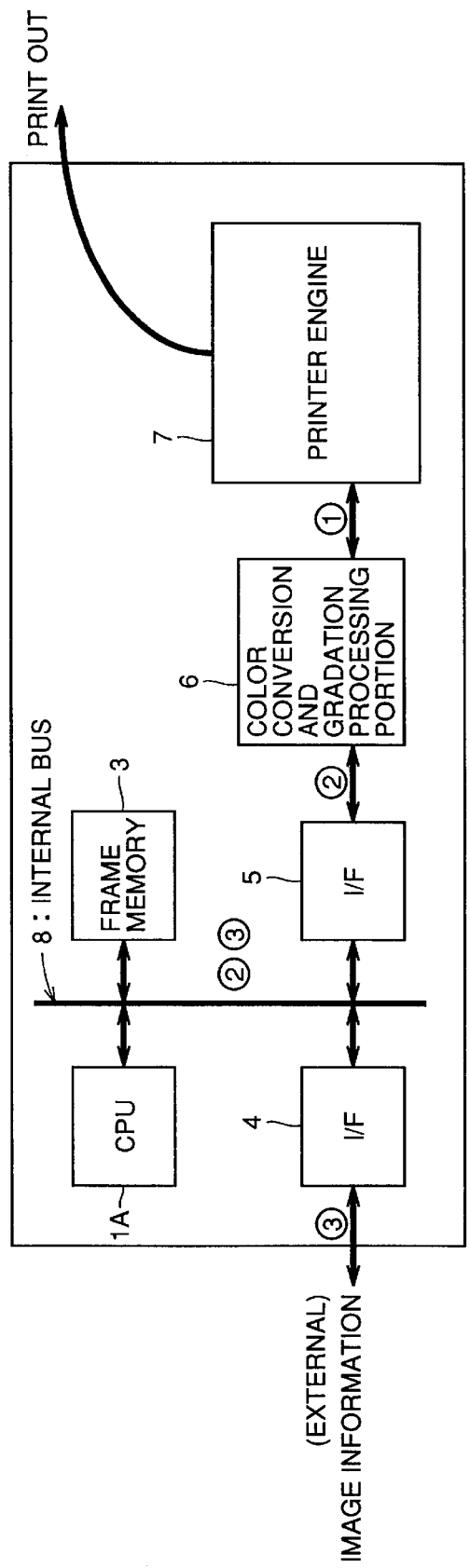
FIG. 9 is a block diagram showing how external image data is received and printed out in a conventional color printer.

Between the portions in FIG. 6, image data is transferred four times corresponding to data transfer ① to ④ in FIG. 6. If an image is recognized by utilizing data in any of the four-time transfer, it is not necessary to newly transfer image data for the image recognition apparatus. Thus, a function of preventing output of an illicit image such as a counterfeited image can be provided without lowering the performance of a conventional printer. Data in data transfer ③ and ④ in FIG. 6 is not suitable for image recognition as described with respect to FIG. 9.

In this embodiment, therefore, image recognition unit 2 for preventing image counterfeiting utilizes data in data transfer ① or ② for recognition. As the characteristics of data in data transfer ① and ②, data in a print range is data before expansion to the form of a "raster image" and is command data formed of a specified protocol such as a printer language. CPU 1 analyzes a protocol in command data, expands it to a raster image in frame memory 3, and overlaps all expanded images. Thus, image data actually formed is completed:

The command data transferred here includes character data, graphic data such as straight lines and circles, bit map image data, and control information such as paper setting and font selection. Of these data, the data which image recognition unit 2 has to recognize is limited to color multi-value image data in bit map image data. It is because from such a view point of counterfeiting prevention using a color copy machine that illicit counterfeiting should be prohibited, synthesizing of any other data can not be an image which should be prohibited from being output (counterfeited image). In other words, recognition of all color multi-value image data sufficiently attains the object of image recognition unit 2 to prevent formation of a prohibited image even if the entire image to be formed is not recognized.

In this embodiment, only when color multi-value image data of command data in data transfer ① and ② in FIG. 6 is expanded, image data is read while transferred specific data is monitored. The specific data which is transferred while color multi-value image data to be monitored is expanded is data necessary to analyze image data of a color multi-value image in command data. For example, it is coordinate data or image size data. The coordinate data indicates coordinates (a memory address) in a working area of frame memory 3 which is used when image data is compressed by CPU 1.

In any of data transfer ① and ② in FIG. 6, bit map data which is not compressed or data which is processed according to a protocol such as that for compression is transferred when expanding color multi-value image data. According to the flow chart in FIG. 7, therefore, image data necessary for recognition can be obtained and recognition for preventing counterfeited image output can be made possible.

In FIG. 7, CPU 1 or image recognition unit 2 first analyzes the process indicated by command data received through internal bus 8, that is, determines whether the process is expansion of a color multi-value image according to whether the command data includes data unique to the color multi-value image data (steps 601 and 602).

If the process is determined to be expansion of the color multi-value image data (YES in step 602), image recognition unit 2 obtains unique data such as an image size from the analysis result (step 603), monitors data which is transferred through internal bus 8 according to the unique data, and at the same time reads the color multi-value image data from the transferred data (step 604).

Then, the feature amount of the read color multi-value image data is extracted, and the extracted feature amount and the feature amount of image data as an object of counterfeiting prevention are recognized such as by pattern matching. Thus, the process according to the recognition result is carried out (step 605).

Here, the process according to the recognition result prevents normal output of input image data when the input image data is recognized to be image data as an object of counterfeiting prevention and, otherwise, does not prevent normal output.

Image recognition unit 2 connected to internal bus 8 of the image formation apparatus in FIG. 6 obtains coordinate data (coordinate information on starting and ending locations) of the color multi-value image data from CPU 1, and image data which is transferred from CPU 1 through internal bus 8 to frame memory 3 for image compression in frame memory 3 is used for recognition. This case will be described in the following.

Recognition in this manner has the following advantages. Since CPU 1 usually analyzes a protocol in command data, image recognition unit 2 does not have to include a protocol analysis function because it receives the analysis result from CPU 1. Since the order of data transfer to frame memory 3 for image compression matches the order of directly processing the command data by CPU 1, image recognition unit 2 can easily carry out recognition without being influenced by the protocol, sufficient time is permitted till printing out is stopped based on the recognition result, and false recognition is prevented.

Since image recognition unit 2 in FIG. 6 is connected to internal bus 8, it obtains, from CPU 1, information on image data which is transferred from CPU 1 through internal bus 8 to frame memory 3, and monitors data transfer between CPU 1 and frame memory 3. Further, notification of the recognition result to various portions is also carried out using internal bus 8. These operations will be carried out according to the flow chart in FIG. 8.

Referring to FIG. 8, when CPU 1 externally receives command data through I/F 4 and internal bus 8 (step 701), it analyzes a protocol in the command data and determines whether the data: includes a command code (unique data indicating coordinate data, image size data and so on) concerning color multi-value image data (step 702). If the received command data includes the command code concerning the color multi-value image data, CPU 1 determines that expansion of the color multi-value image data is to be carried out (YES in step 702), and sends, to image recognition unit 2, coordinate data (starting and ending locations) indicating a working area in frame memory 3 at the time of expansion of the color multi-value image data, image size data, and the like which are obtained by analyzing the received command data (step 703).

When image recognition unit 2 receives the coordinate data and the like sent from CPU 1 (step 704), it monitors data transferred to internal bus 8 (step 705). Since internal bus 8 can also be used to transfer data other than a color multi-image data for image recognition unit 2, image recognition unit 2 has to check the source and destination of data on internal bus 8 and receive and recognize only necessary data.

For the checking, such a piece of data among data on internal bus 8, of which source information indicates that its source is CPU 1, that is, internal bus 8 is used by CPU 1 and an writing operation is carried out for internal bus 8 and of which destination information corresponds to coordinate data of frame memory 3 received from CPU 1 in step 704, is determined to correspond to the color multi-value image data which is notified from CPU 1 (steps 706 and 707).

When it is determined that the data received through internal bus 8 corresponds to the color multi-value image data notified from CPU 1 (YES in step 707), image recognition unit 2 extracts a feature amount concerning the received color multi-value image data as described above, and recognizes the extracted feature amount and that of an image as an object of counterfeiting prevention prepared beforehand by pattern matching (step 708).

When it is determined that the image of the received color multi-value image data is likely to be an image as an object of counterfeiting prevention and thus normal printing out should be prohibited as a result of recognition (YES in step 709), image recognition unit 2 sends to CPU 1 a prohibit signal to prevent printing out of the image as an object of counterfeiting prevention (step 710).

When CPU 1 receives the prohibit signal from image recognition unit 2, it outputs, to color conversion and gradation processing portion 6 or printer engine 7 through I/F 5, an instruction signal to cover an output image with toner of a prescribed color, an instruction to make color setting insufficient by lowering the temperature of color setting, and an instruction signal not to print anything, operates to destroy the printer apparatus itself, or operates to collect print out sheets or make holes in the sheets. As a result, normal printing out of input image data which is an image as an object of counterfeiting prevention is prevented.

On the other hand, when image recognition unit 2 determines that the image by the received image data is less likely to be an image which is prohibit from being printed out (counterfeited image) and normal printing out may be permitted (NO in step 709) as a result of recognition, normal printing out of the image data is instructed to color conversion and gradation processing portion 6 and printer engine 7 through CPU 1.

Thereafter, image recognition unit 2 determines whether reception of all data of the recognized image data has been ended by comparing the address of coordinate data received from CPU 1 and destination information indicated by the received image data (an address on frame memory 3) (step 711). If the both addresses are matched, all data have been recognized for image data to be recognized; and thus the process returns to step 704.

If the both addresses are not matched, however, all data have not been recognized for image data to be recognized, and thus the process returns to step 706.

The determination in step 711 may be carried out based on the amount of transferred data.

As described above, by monitoring transfer data on internal bus 8, image recognition unit 2 can effectively obtain only image data necessary for recognizing images for counterfeiting prevention, and the counterfeiting prevention function can be easily incorporated into general image formation apparatuses. According to the apparatus shown in FIG. 6, only necessary partial data of image data can be recognized, thereby reducing the size of an image processing circuit, improving the recognition speed, reducing the false recognition rate and lowering the cost. Since data prior to color conversion is utilized, RGB color data with lesser data amount can be easily obtained for recognition, thereby reducing the size of an image processing circuit, improving the recognition speed and lowering the cost.

By monitoring transfer data on internal bus 8, the function standard, for example, of the printing speed of a printer is not deteriorated, and the function shown in FIG. 6 can be incorporated into a printer. Since recognition is carried out before data is input to printer engine 7, there is enough time to prevent printing out of an illicit image (counterfeited image).

What is claimed is:

1. A print system using a printer equipped with an image recognition unit for counterfeiting prevention, including a computer having an installed printer driver, and a printer containing an image recognition unit for counterfeiting prevention and a printing out device controlled according to a recognition result of said image recognition unit, said printer driver of said computer having a function of expanding a command received from an application to image data and then outputting it to said printer, and said controller of said printer having a function of operating said image recognition unit for counterfeiting prevention for image data received from said computer, characterized in that said computer has a function of sending to said printer a control signal for instructing operation of said image recognition unit for counterfeiting prevention when a type of said command received from said application is a command type of an image as an object of counterfeiting prevention, and not sending said control signal to said printer when the type of said command is not the command type of an image as an object of counterfeiting prevention, and said printer has a function of operating said image recognition unit for counterfeiting prevention only when said control signal is received from said computer, and said command type of an image as an object of counterfeiting prevention is a command indicating a color multi-value bit map image.

2. A computer including a printer driver having a function of expanding a command received from an application to image data and then sending it to a printer, characterized in that said computer has a function of outputting to said printer a control signal for instructing operation of an image recognition unit for counterfeiting prevention when a type of said command received from said application is a command type of an image as an object of counterfeiting prevention, and not outputting said control signal to said printer when the type of said command is not the command type of an image as an object of counterfeiting prevention, and said command type of an image as an object of counterfeiting prevention is a command indicating a color multi-value bit map image.

3. A print system using a printer equipped with an image recognition unit for counterfeiting prevention, including a computer having a printer driver, and a printer having an image recognition unit for counterfeiting prevention and a printing out device controlled according to a recognition result of said image recognition unit, said printer driver of said computer having a function of outputting a command received from an application without expanding it to image data, and a controller of said printer having a function of operating said image recognition unit for counterfeiting prevention for said image data obtained by expanding said command received from said computer to an image, characterized in that said controller has a function of not operating said image recognition unit for counterfeiting prevention when a type of said command received from said computer is not a command type of an image as an object of counterfeiting prevention, and said command type of an image as an object of counterfeiting prevention is a command indicating a color multi-value bit map image.

4. A printer having an image recognition unit for counterfeiting prevention, a printing out device controlled according to a recognition result of said image recognition unit, and a controller, said controller having a function of operating said image recognition unit for image data obtained by expanding a command received from a computer to an image, characterized in that said controller has a function of not operating said image recognition unit for counterfeiting prevention when a type of said command received from said computer is not a command type of an image as an object of counterfeiting prevention, and said command type of an image as an object of counterfeiting prevention is a command indicting a color multi-value bit map image.

5. A recording medium on which a program is recorded for causing a computer to function as means for expanding a command received from an application to image data and then outputting it to a printer, and means for outputting to said printer a control signal for instructing execution of image recognition for counterfeiting prevention when a type of said command received from said application is a command type of an image as an object of counterfeiting prevention, and not outputting said control signal to said printer when the type of said command is not the command type of an image as an object of counterfeiting prevention, and said command type of an image as an object of counterfeiting prevention is a command indicating a color multi-value bit map image.

6. A recording medium on which a program is recorded for causing a computer to function as a printer including means for operating a printing out device according to image data obtained by expanding an externally applied command to an image, means for executing image recognition for counterfeiting prevention for said image data obtained by expanding said externally applied command to an image, and means for controlling not to operate said means for executing image recognition when a type of said externally applied command does not correspond to a command type of an image as an object of counterfeiting prevention, and said command type of an image as an object of counterfeiting prevention is a command indicating a color multi-value bit map image.

7. A method of controlling printing for preventing counterfeiting of a bank note or securities, the method comprising:

examining whether received input data includes a type of image data that corresponds to a type of image data being an object of counterfeiting prevention;

examining in detail, upon detection in said first examining act that the type of image data corresponds to said type of image data being an object of counterfeiting prevention, the image data to determine whether or not the image data are image data of said object of counterfeit prevention; and permitting printing of said input data, upon detection in said first examining act that the type of image data does not correspond to the type of image data being an object of counterfeiting prevention, or upon detection in said second examining act that the image data are not image data of said object of counterfeiting prevention;

wherein in said first examining act examining is based on the type of image data as indicated by a color image command of said input data.

8. The print control method according to claim 7, wherein the type of image data being the object of counterfeiting prevention is a color multi-value bit map image data type.

9. The print control method according to claim 7 or 8, applied to a print system including a printer and a computer controlling said printer, wherein said first examining act is performed in said computer and said computer outputs a control signal, if said type of input data corresponds to a type of image data being the object of counterfeit prevention, and said second examining act and said permitting printing act are performed in said printer, wherein said second examining act is performed when said control signal is received from said computer.

10. The print control method according to claim 7 or 8, applied to a printer, wherein said method is performed in said printer.

11. The print control method according to claim 7 or 8, wherein said input data includes a conversion instruction for expanding bit map data to print data.

12. The print control method according to claim 9, wherein said input data includes a conversion instruction for expanding bit map data to print data.

13. The print control method according to claim 10, wherein said input data includes a conversion instruction for expanding bit map data to print data.

14. In a print system including a printer and a computer controlling said printer, for preventing counterfeiting of a bank note or securities, a computer readable recording medium having a program recorded thereon to have said computer function as examining means examining whether received input data includes a type of image data that corresponds to a type of image data being an object of counterfeiting prevention, wherein in said printer, upon detection by said examining means that said type of image data corresponds to said type of image data being the object of counterfeiting prevention, the image data is examined in detail to determine whether the image data is the image data of said object of counterfeiting prevention, and printing of said image data by said printer is permitted upon detection by said examining means that the type of image data does not correspond to the type of image data being the object of counterfeiting prevention, or upon detection in said detailed examining that the image data is not the image data of said object of counterfeiting prevention; and wherein in said examining means examining is based on a type of image data as indicated by a color image command of said input data.

15. A print control apparatus for preventing counterfeiting of a bank note or securities, comprising:

first examining means for examining whether received input data includes a type of image data that corresponds to a type of image data being an object of counterfeiting prevention;

second examining means, responsive to detection by said first examining means that a type of said image data corresponds to the type of image data being the object of counterfeiting prevention, examining in detail whether the image data is image data of said object of counterfeiting prevention; and print permitting means for permitting printing of said input data, upon detection by said first examining means that the type of image data does not correspond to a type of image data being the object of counterfeiting prevention, or detection by said second examining means that the image data is not image data of said object of counterfeiting prevention;

wherein in said first examining means examining is based on the type of the image data as indicated by a color image command of said input data.

16. The print control apparatus according to claim 15, wherein the type of image data being the object of counterfeiting prevention is a color multi-value bit map image data type.

17. The print control apparatus according to claim 15 or 16, wherein said print control apparatus is applied to a print system including a printer and a computer controlling said printer, said first examining means is provided in said computer and said computer outputs a control signal, if said type of image data corresponds to a type of image data being the object of counterfeit prevention, and said second examining means and said print permitting means are provided in said printer, said second examining means examining said image data when said control signal is received from said computer.

18. The print control apparatus according to claim 15 or 16, wherein said print control apparatus is provided in a printer.

19. The print control apparatus according to claim 15 or 16, wherein said input data includes a conversion instruction for expanding bit map data to print data.

20. The print control apparatus according to claim 17, wherein said input data includes a conversion instruction for expanding bit map data to print data.

21. The print control apparatus according to claim 15, wherein said input data includes a conversion instruction for expanding bit map data to print data.

* * * * *

UNITED STATES PATENT AND TRADEMARK OFFICE
CERTIFICATE OF CORRECTION

PATENT NO. : 6,687,017 B1
DATED : February 3, 2004
INVENTOR(S) : Takashi Kakiuchi et al.

It is certified that error appears in the above-identified patent and that said Letters Patent is hereby corrected as shown below:

<u>Title page,</u>
Item [56], References Cited, Insert the following U.S. Patent:
-- 5,390,003 A  2/1995   Yamaguchi et al. .................355/201 --

Signed and Sealed this

Twenty-fifth Day of May, 2004

JON W. DUDAS
*Acting Director of the United States Patent and Trademark Office*